United States Patent Office 3,158,531
Patented Nov. 24, 1964

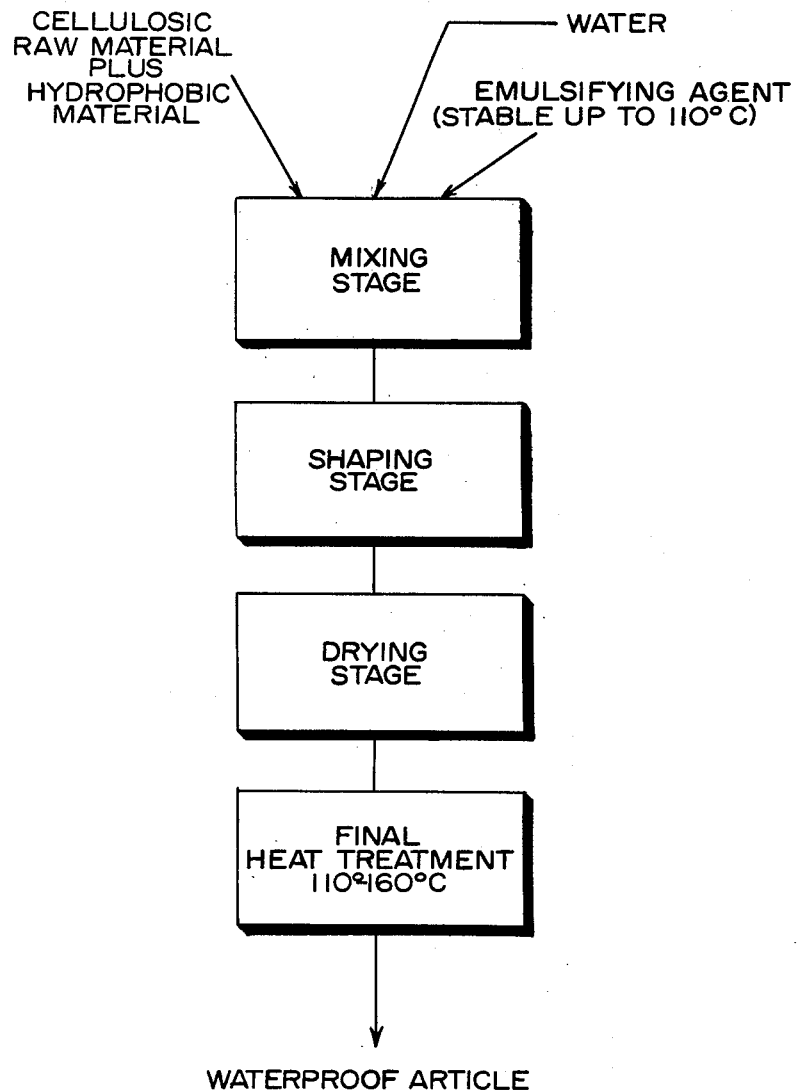

3,158,531
PROCESS FOR THE PRODUCTION OF WATER-PROOF MATERIALS FROM WASTE PAPER CONTAINING BITUMEN AND/OR WAX
Ernst Rohrer, Buchs, Sankt Gallen, Switzerland
Filed Aug. 17, 1962, Ser. No. 217,527
Claims priority, application Switzerland Aug. 18, 1961
7 Claims. (Cl. 162—5)

The utilization of refuse paper containing tars, bitumens and/or waxes is a problem of high economical interest. The object of corresponding recovery or reconditioning processes is the production of pure fibrous materials adapted as starting materials for the manufacture of regenerated paper, paperboard and carton. To achieve this object, several different processes were developed in the past, the following being the most important:

(1) Extraction of the refuse paper mass with organic solvents.

Corresponding processes in commercial scale have not proven successful, since they necessitate expensive plants for recovery of the solvents. In addition complete extraction requires extensive amounts of time, and in spite of this the effectiveness of such extraction processes in general is only up to 94 to 95%. The proportion of bitumen and/or wax remaining in the fiber dispersion is very injurious in the subsequent processing, since these materials tend to stick to the container walls, sieves and felts.

(2) Chemical modification of the bitumen and/or wax.

In most instances these processes involve a substantially complete saponification of the undesirable materials. The corresponding consumption of hydrolyzing reagents is very high compared with the effect obtained. In addition, complete saponification of the water-insoluble undesirable materials cannot be achieved without damaging the fibers severely. A further problem is the removal of the saponified products, which is accomplished by washing. However, upon increasing dilution of the solution the stability of the saponified products decreases so that the insoluble undesirable materials are formed again.

(3) Heat treatment.

By heating an aqueous slurry of the disintegrated waste material a particle separation of the tarry, bituminous and/or waxy components can be accomplished. In such processes the total waste material is heated in an aqueous suspension, which if desired may be slightly alkaline to a temperature which is higher than the melting point of the bituminous and/or waxy impregnating agents. These agents accumulate at the surface of the aqueous slurry, from which they can be removed. However, this method besides being highly dependent on the fiber concentration, never leads to a complete removal of the impurities in question. Experimental tests reveal that more or less satisfactory results are obtained only if the fiber concentration is less than 4%. However, the economy of the process decreases with increasing dilution, since a high degree of dilution requires great quantities of water which must be heated. Further, certain types of bitumens, e.g. highly blown bitumens, cannot be removed by this method, since their melting points exceed the boiling point of water.

(4) Emulsification of the undesirable materials.

By addition of emulsifiers the main proportion of the injurious components can be removed. In corresponding processes the bituminous and/or waxy substances are emulsified and washed out in this state. While the emulsification can be achieved readily, the removal of the emulsified products is difficult and the complete removal of the emulsified products is impossible, even if large quantities of water are used. In addition, important losses in fibrous material occur. Further, considerable amounts of emulsifier cannot be prevented from remaining in the fibrous material and consequently also in the finished product where they impair the behaviour against water.

(5) Mechanical separation of the undesirable materials.

The separation of the undesired components by mechanical means can be carried out only if the substances which are to be removed are hard and in granular form. According to the mechanical method soft bitumina were converted to products of high softening point, and the latter were removed by brushing or by sandblast. With this method optimum results with respect to the removed impurities approximate 90%, while at least 10% remain in the recovered product. This result in most instances is unsatisfactory, as the remaining granular materials appear in the finished product as undesired spots.

All prior processes for the recovery of refuse paper containing bitumen and/or wax are deficient in achieving a complete removal of the undesirable materials in question. Accordingly they all suffer from the fact, that the plants used become contaminated by sticky materials. A further problem arises from the extensive quantities of waste-water. In the solvent extraction processes continuously small amounts of solvent are drained off together with the waste-water. In the oil trap of the waste-water purifying plant these solvents however affect the separation of oily contaminants. In the methods carried out by means of saponification or emulsification the water-repellent substances are washed out and directly get into the waste-water. If such waste-water is supplied to a sewage-treatment plant it affects the sedimentation and the biological clarification process.

In practising the above processes it became apparent that those methods which are generally successful in separating the bituminous and/or waxy contaminations from the paper mass with view to the recovery of the waste-water which they produce are highly unsatisfactory. Therefore their replacement by more satisfactory method is desirable.

It is an object of the present invention to provide a process for the recovery of refuse paper containing tars, bitumens and/or waxes which evades the heretofore existing difficulties outlined above. A further object is the preparation of water proof materials and especially sheet-like articles from refuse paper containing bitumens and/or waxes.

A still further object is a process for the preparation of said waterproof materials from fibrous cellulosic waste materials such as e.g. waste paper, banana plants, millet straw and the like, which contain no bituminous or waxy materials.

It was found that for many practical purpose removal of the bituminous or waxy impregnating agents from the waste-paper slurry is not necessary at all and that disintegration of these agents into finely dispersed particles yields satisfactory results. The process of the present invention is based on the above discovery and comprises wetting in the presence of appropriate emulsifiers bitumen and/or wax-containing waste-paper, if desired together with bitumen and wax-free waste paper, or a mixture of fibrous cellulosic waste-material free of bitumen and/or wax and a corresponding amount of said hydrophobic agents, and beating the resulting slurry by methods conventionally used in the paper industries.

The concentration of the emulsifier is controlled so that the resulting emulsion will remain stable until the finished product, i.e. the blanks of paper or paperboard will be formed. Breaking of the emulsion is to be prevented at any event. For the sake of minimum consumption of emulsifiers the aqueous phase is circulated in a closed system. By means of this method all problems concerning the recovery of waste-water as well as losses of fibrous materials are avoided. Excessive loading of the circulating water by the emulsifying agents or by fillers does not occur, since a certain amount of this water is continuously drawn off together with the moist product, while fresh water is supplied in the washing stage. By maintaining a stable emulsion during the total paper manufacturing process incrustations and clogging in the containers, on the sieves and felts or at any site of the plant are obviated. On the contrary, the sieves and felts and other parts of the plant are continuously purged since hydrophobic materials which tend to collect at these points are spontaneously emulsified.

The drainage of the fiber pulp obtained according to the present invention on sieves or felts as well as in pressing devices is achieved more readily than it is the case with conventional pulps. Accordingly, greater bulks can be drained off in every batch. By this fact the output of a given plant can be increased by 50% and more.

Especially in the subsequent drying stage considerable advantages result from the present invention. The emulsifier should advantageously be temperature stable up to 100 to 110° C. in order to facilitate the drying operation. For, in the presence of a stable emulsifier the moisture passes more readily from the inside of the material to be dried to the surface, since by presence of said emulsifier the capillary forces are increased. Accordingly, in the manufacture of thick paperboards no blowholes are formed during the drying operation even if the sheets are dried rapidly.

After the drying step the emulsifier remains fully active in the finished product. This fact in most cases is inconvenient. In order to eliminate the undesirable presence of the emulsifiers in the final products according to the present invention; emulsifying agents are used which are active up to the temperatures normally used in the drying stage, i.e. at temperatures up to about 110° C., and which, however, decompose at higher temperatures. Thus they can be removed by a final heat treatment. The decomposition temperature of the emulsifier should not exceed 160° C., since higher temperatures might damage the fibrous material.

In the final heat treatment the dried products become water proof. This step must be carried out at a temperature at which the chosen emulsifier decomposes. However, not only the temperature, but also the duration of the final heat treatment, should be controlled with respect to the properties of the emulsifier used. The heat treatment can be carried out in a closed heated chamber, on a moving band by blowing dry stream on the surface of the product, by infra-red radiation or by a high-frequency field. Treatment with infra-red radiation preferably is carried out in a steam-containing atmosphere.

Especially advantageous for use in the instant process are those emulsifiers which decompose between 110° and 160° C. and upon decomposition yield products which are hydrophobic and accordingly contribute to the quality of the final product. Good results were obtained by use of higher alkyl sulfonic acids of more than 10 carbon atoms, higher alkyl-sulfates and quaternary ammonium compounds with at least one paraffinic hydrocarbon chain of more than 10 carbon atoms.

The particle size of the hydrophobic substances is controlled by the amount of added emulsifier. According to the desired quality of the final product a simple dispersion or a real emulsion can be prepared.

In the preparation of waterproof products from starting materials containing no impregnating agents the following procedure may be applied: The cellulosic fibrous material, i.e. waste paper and/or plant material, is beaten to yield individual fibers in a manner conventionally used in the papermaking industries. Prior to or after this treatment a controlled amount of hydrophobic substances is added. Depending upon the desired result these substances are added in a dispersed or emulsified state. The amount of added emulsifier should be sufficient so that an emulsion results which remains stable during the entire processing. After drying of the resulting pulp the emulsifier is destroyed by means of the heat treatment indicated above.

Reference is made to FIGURE 1 which is a flow diagram of the instant process graphically illustrating the stages through which the process proceeds.

The following specific examples will serve to further illustrate the present invention. Parts indicated are by weight.

*Example 1*

1000 parts of refuse paper containing bitumen are mixed with 1000 parts of water containing 3 parts of methyl dicetyl benzyl ammoniumchloride, whereafter the mixture is beaten in a manner known to the expert in papermaking. In a subsequent process step dilution to the concentration at which the pulp is formed is accomplished by addition of water which contains a further amount of methyl dicetyl benzyl ammoniumchloride in sufficient quantities to result in a final concentration of about 0.1 to 0.15% (as soon as the water necessary for this operation is provided by the circulating stream, the latter addition of emulsifying agent is superfluous, and simultaneously the amount added to the starting materials may be decreased considerably).

The fiber pulp is then shaped to obtain a sheet material which is dried at 100° to 110° C. The dried material is heated to 150° by means of an infrared radiator for a period of time sufficient to decompose the total emulsifying agent.

*Example 2*

1000 parts of banana bushes (total plant), 500 parts of millet straw and 500 parts of waste-paper were steeped and beaten in the usual way. To this fiber pulp 150 parts of ground bitumen having a softening point of 40° to 45° C. were added, and this hydrophobic additive was emulsified by means of 6 parts of methyl dicetyl benzyl ammoniumchloride.

The fiber pulp containing in admixture the emulsified bitumen was then shaped by conventional methods to yield sheetlike articles and dried at 100° C. The subsequent heat treatment was carried out by blowing dry steam of 200° C. on the surface of the product.

I claim:
1. A process for the preparation of waterproof sheetlike articles from fibrous cellulosic materials which comprises: (1) combining a starting material selected from the group consisting of (*a*) raw materials comprising tar, bitument and/or wax-containing waste-paper; (*b*) mixtures of fibrous cellulosic waste materials free of tar, bitumen and/or wax with an appropriate separately added amount of said tar, bitumen and/or wax; and (*c*) mixture of (*a*) and (*b*); water; and a quaternary ammonium emulsifying agent containing at least one paraffinic hydrocarbon chain of more than 10 carbon atoms and which agent is stable at temperatures up to at least about 100° C. to about 110° C. and which decomposes at a temperature above about 110° C. in an amount sufficient to maintain a stable emulsion during the whole subsequent processing of the pulp; (2) mixing to obtain a homogeneous pulp; (3) processing the pulp by shaping and drying to obtain sheetlike articles therefrom; and (4) subjecting the sheets so obtained to a heat treatment which is carried out at a temperature above the decomposition temperature of the emulsifying agent.

2. A process according to claim 1, wherein the emulsifying agent is one which is stable at a temperature up to about 100° C. to 110° C. and decomposes at a temperature between about 110° C. and about 160° C.

3. A process according to claim 2, wherein the heat treatment is carried out at a temperature between about 110° C. and 160° C.

4. A process according to claim 1, wherein the emulsifying agent which is used decomposes to produce hydrophobic decomposition products.

5. A process according to claim 1 wherein the water added to the starting materials is at least partially supplied by recirculation of water drained off in the drying stage.

6. A process according to claim 1 wherein the starting material consists of a mixture of bitumen and/or wax-containing refuse-paper and waste-paper free of bitumen and/or wax.

7. A process according to claim 1 wherein the starting material consists of a mixture of waste-paper, fibrous cellulosic plant materials and bitumen.

References Cited in the file of this patent

UNITED STATES PATENTS

| | | |
|---|---|---|
| 2,183,259 | Hill | Dec. 12, 1939 |
| 2,236,900 | Greider | Apr. 1, 1941 |
| 2,538,926 | Sutherland | Jan. 23, 1951 |
| 2,544,887 | Leonard | Mar. 13, 1951 |
| 2,954,313 | Woodward | Sept. 27, 1960 |

FOREIGN PATENTS

| | | |
|---|---|---|
| 438,403 | Great Britain | Nov. 15, 1935 |